Feb. 10, 1925.
W. P. KNAUSS
1,525,866
HEADLIGHT REFLECTOR
Filed April 5, 1923
2 Sheets-Sheet 1
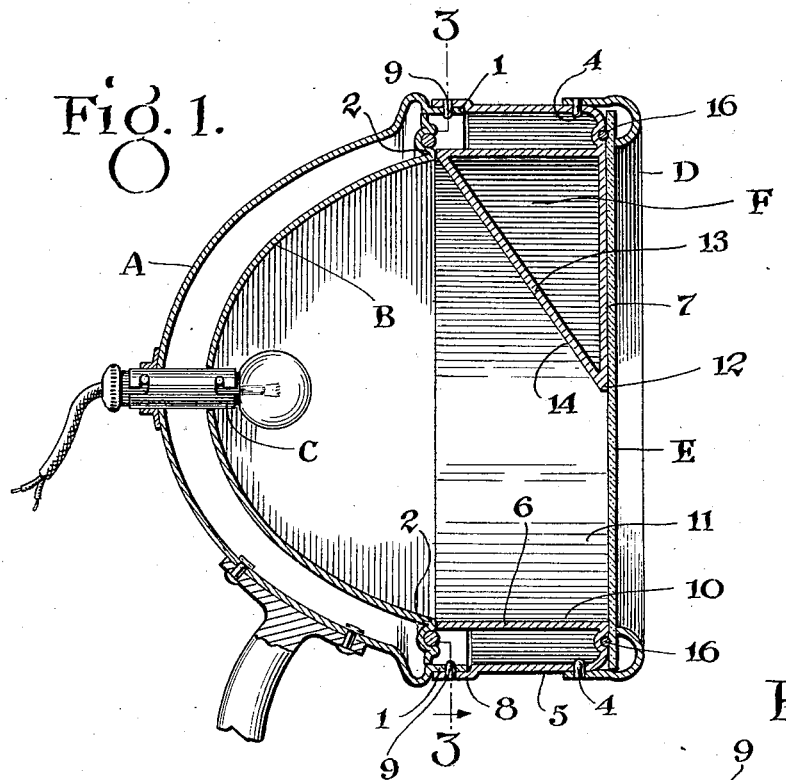
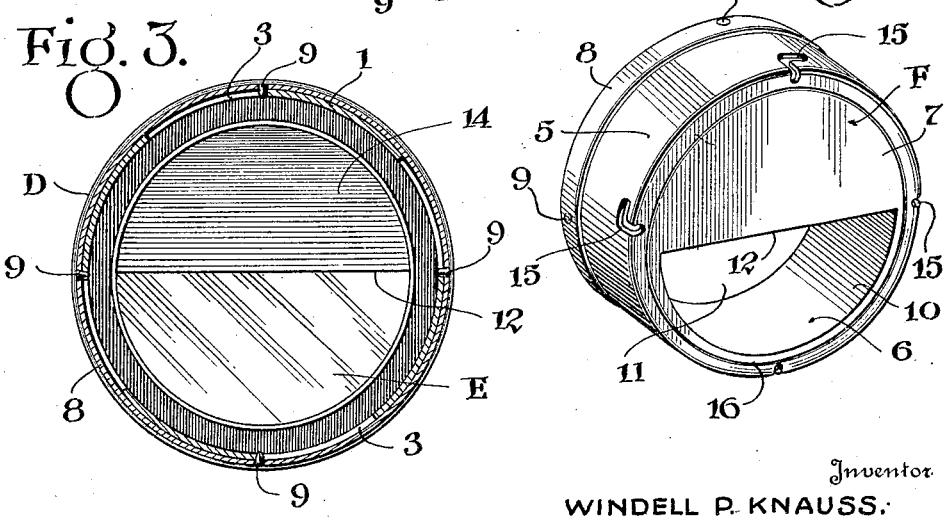
Inventor
WINDELL P. KNAUSS.
Attorney Feb. 10, 1925.
W. P. KNAUSS
1,525,866
HEADLIGHT REFLECTOR
Filed April 5, 1923
2 Sheets-Sheet 2
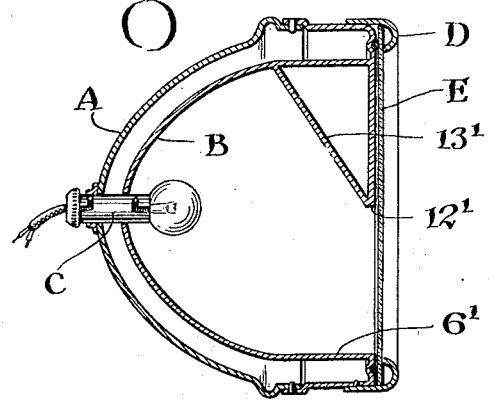
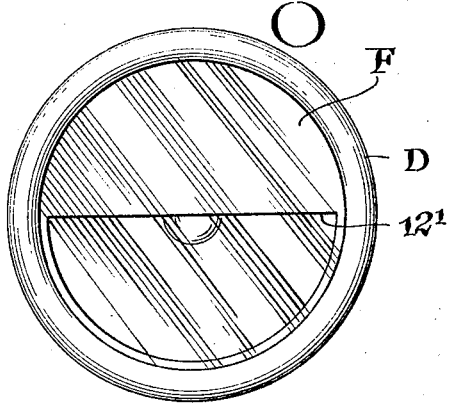
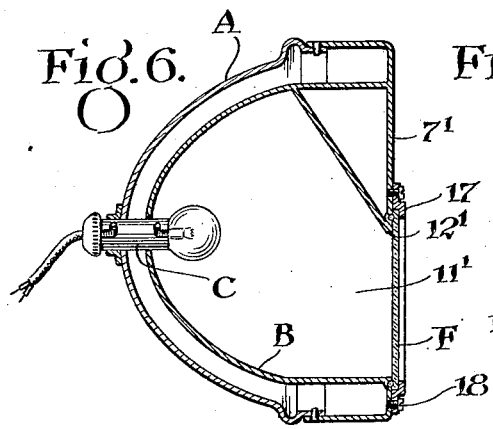
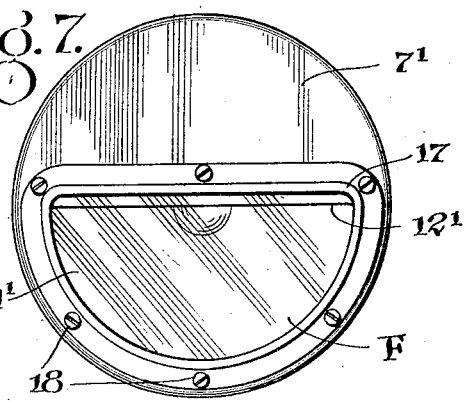
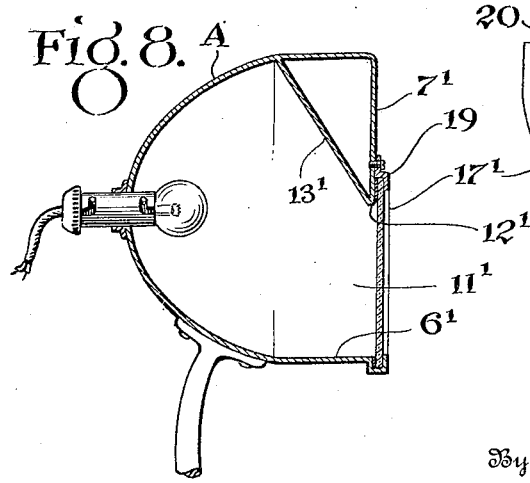
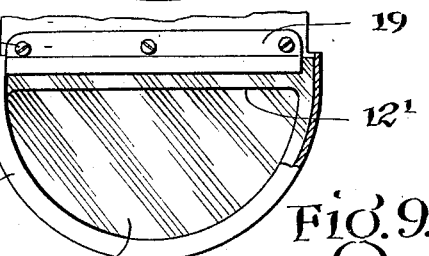
Inventor
WINDELL P. KNAUSS
Attorney Patented Feb. 10, 1925.

1,525,866

UNITED STATES PATENT OFFICE.

WINDELL P. KNAUSS, OF COLUMBUS JUNCTION, IOWA.

HEADLIGHT REFLECTOR.

Application filed April 5, 1923. Serial No. 630,167.

*To all whom it may concern:*

Be it known that I, WINDELL P. KNAUSS, a citizen of the United States, residing at Columbus Junction, in the county of Louisa and State of Iowa, have invented certain new and useful Improvements in Headlight Reflectors, of which the following is a specification.

My invention relates broadly to improvements in illuminating projectors and especially to the type of projectors known as headlights, such as are in common use on automobiles and other road vehicles.

More particularly, my invention relates to headlight reflectors and the provision of means whereby the beam of light projected forwardly from said reflector for distant illumination, will not obstruct the vision of or be objectionable to the eyes of pedestrians or occupants of approaching vehicles.

The primary object of my invention is, therefore, to provide a headlight reflector adapted to project long beams of mellow, indirect light for distant illumination and strong, direct rays of light, focused upon the roadway, for near illumination.

A further object of my invention is to provide a reflector and screen of this character which is adapted for ready attachment to automobile headlights of standard construction.

A still further object of my invention is to provide a device of this character equipped for attachment to the lens rim securing means of headlights of standard construction and having means thereon adapted to receive and lock the lens rim thereto.

It is also an object of my invention to provide a device of this character which will be simple and inexpensive in construction and positive and reliable in operation, all as will be hereinafter more fully described and claimed.

Referring now to the accompanying drawings which are made a part hereof and on which similar reference characters indicate similar parts—

Figure 1 is a vertical transverse section of a standard automobile headlight equipped with the preferred form of my improved reflector screen and showing the headlight lens and lens rim mounted thereon;

Fig. 2 is a front perspective view of my invention as it appears detached from the headlight, showing in detail the means for securing the headlight lens rim thereto;

Fig. 3 is a transverse section taken on line 3—3 of Fig. 1, showing a rear view of my improved reflector screen, and details of its locking connection with the shell of an automobile headlight;

Fig. 4 is a vertical transverse section of a modified form of my invention, showing the parabolic reflector and reflector screen formed integral, and as in the preferred form in Fig. 1, with the headlight lens rim mounted thereon;

Fig. 5 is a front view of a standard automobile headlight equipped with my invention to show the several parts in assembled position;

Fig. 6 is a further modified form of my invention showing in section the parabolic reflector formed integral with the reflector screen as in Fig. 4, and a lens secured in a semi-circular frame surrounding the opening in the front side of the reflector screen;

Fig. 7 is a front view of the reflector screen shown in Fig. 6;

Fig. 8 is a still further modified form of my invention showing in section the reflector screen formed integral with the headlight shell or housing and the lens holding rim formed integral with the reflector screen; and Fig. 9 is a front detail view partly in section, of the lens holding rim shown in Fig. 8.

In the drawings, the portions indicated as A represent the outer shell or housing of a conventional automobile headlight in which a parabolic reflector B and lamp sockets C are mounted. All of these parts and likewise the annular lens holding rim D and lens E, shown in Figs. 1, 3, 4 and 5, may be of any well known or approved design. In headlights of conventional design the housing A is formed with an annular extension 1 which projects outwardly beyond the rim 2 of the parabolic reflector B and is provided at intervals with bayonet slots 3 in which the locking pins 4 of the headlight lens rim D are adapted to engage.

My improved reflector screen F, as illustrated in Figs. 1, 2 and 3, constitutes a substantially integral construction and comprises concentric tubular walls 5 and 6 joined at their outer extremities to a face plate 7 and adapted at their inner extremities to engage with the annular extension 1 of the headlight housing A and the rim 2 of the parabolic reflector B, respectively. The outer tubular wall 5 is formed with an annular boss 8 which is adapted to snugly fit over the annular extension 1 of the headlight housing A, and is provided with locking pins 9 adapted to engage the bayonet slots 3 in the annular extension 1. The inner tubular wall 6 is spaced a sufficient distance from the outer concentric wall 5 to cause its polished surface 10 to abut and register with the outer edge or rim 2 of the parabolic reflector B and thereby form an extension thereof in use.

A semicircular opening 11 is formed in the face plate 7 having its arcuate lower extremity flush with the inner polished surface 10 of the tubular wall 6 and its straight upper extremity 12 extending transversely through the horizontal axis of the reflector screen F. Extending from the inner, upper edge of the tubular wall 6, to the straight upper extremity 12 of the semicircular opening 11, in the face plate 7, is a reflector screen 13, having a flat, polished surface 14 which extends at substantially 45° to the horizontal axis of the reflector screen F.

By reference to Fig. 1 it will be noted that the rays of light projected by the reflector B above the horizontal axis of the reflector screen F will be deflected back to the reflector B from which they will again be reflected below the straight lower edge 12 of the deflector 13 and through the semicircular opening 11 in the face plate 7. It will also be noted that by the use of my improved reflector screen the full reflecting power of the reflector B is utilized and intensified by the additional reflecting surfaces 6 and 14, so that the light projected through the opening 11 will be greatly increased and the objectionable glare, due to direct rays above a predetermined plane, eliminated.

Bayonet slots 15 are formed at intervals in the tubular wall 5 adjacent the outer extremity in which locking pins 4 of the headlight lens rim D are adapted to engage to secure the lens E firmly against a packing ring 16 seated in an annular groove near the periphery of the face plate 7.

It will be understood that, in the preferred form of my invention, as shown in Figs. 1, 2 and 3, an attachment is illustrated as adapted for ready attachment to headlights of conventional design, by first removing the lens rim D and lens E from the annular extension 1, securing my improved reflector screen F thereto in the manner described, and then securing the lens rim D and lens E to the face plate of the reflector screen F.

In Fig. 4 the parabolic reflector B is shown formed integral with the tubular wall 6' and deflector screen 13'; otherwise the construction of this modification is identical with that shown and described in illustration of Figs. 1, 2 and 3.

In Figs. 6, 7, 8 and 9, my invention is shown applied to headlights of special design. In Figs. 6 and 7 the face plate 7' is provided with a lens rim 17 surrounding the semicircular opening 11' and secured to the face plate 7' by screws 18. In Figs. 8 and 9 the reflector screen 13' and tubular wall 6' are formed integral with the headlight housing A and the lens rim 17' formed integral with the edge of the semicircular opening 11' in the face plate 7'. In this modification a lens securing plate 19 is secured to the face plate 7 adjacent the straight edge 12', of the opening 11', by screws 20 to permit ready removal of the lens from the integral rim 17'.

Although I have shown and described a preferred construction and several modifications of my invention for accomplishing the objects heretofore enumerated, it will be understood that various modifications may be made therein by those skilled in the art without departing from the spirit of my invention as defined in the following claims.

What I claim is:

1. In combination with a headlight comprising a housing and a parabolic reflector mounted therein, a supplemental detachable tubular reflector having an inwardly faced inclined reflector screen, and a removable lens-holding member attached to one end of said tubular reflector.

2. In combination with a headlight comprising a housing and a parabolic reflector mounted therein, a supplemental detachable tubular reflector having an inwardly faced inclined reflector screen disposed above the horizontal axis thereof and closing a portion of one end of said tubular reflector, and a removable lens-holding member detachably secured to said end of said tubular reflector.

3. In combination with an automobile headlight having a lens-attaching rim, a supplemental detachable tubular reflector having an inwardly faced inclined reflector screen detachably connected to said rim, and a removable lens-holding member attached to and closing one end of said tubular reflector.

In testimony whereof I affix my signature.

WINDELL P. KNAUSS.